Aug. 11, 1953
G. A. DEAN
2,648,454
KNOCKDOWN STREAMLINED CONTAINER
Filed Sept. 17, 1948
2 Sheets-Sheet 1
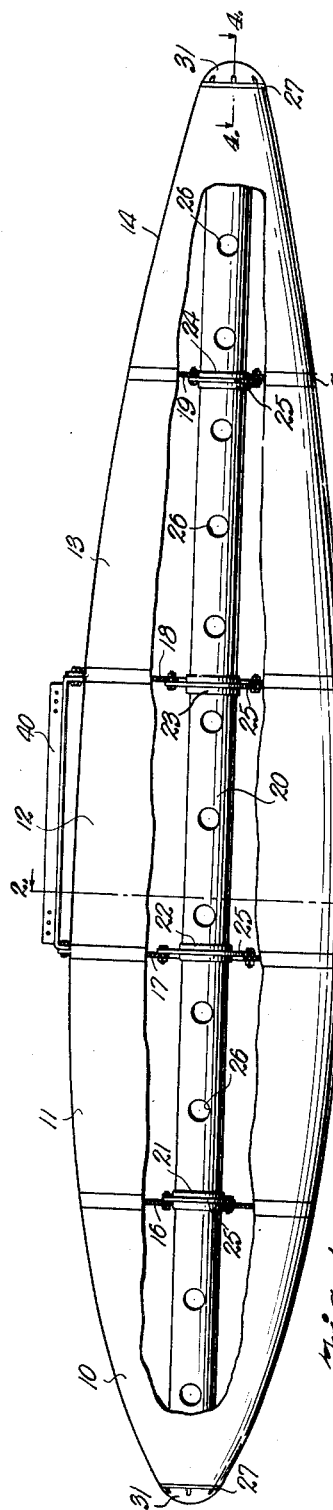
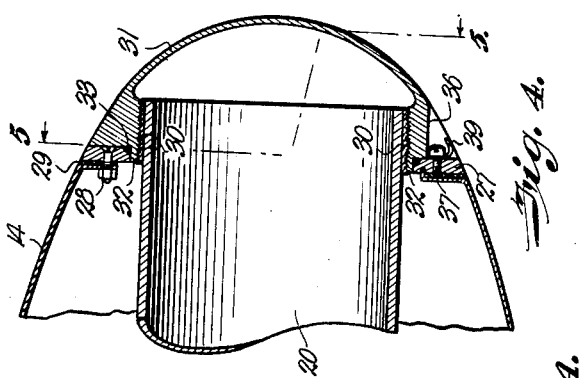
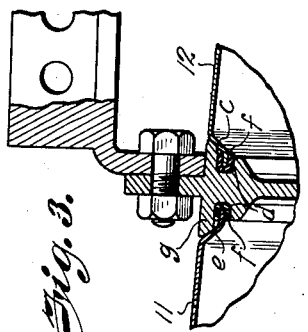
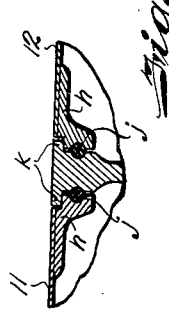
Inventor
George A. Dean
By Thos. E. Scofield
Attorney Aug. 11, 1953           G. A. DEAN           2,648,454
KNOCKDOWN STREAMLINED CONTAINER
Filed Sept. 17, 1948                                        2 Sheets—Sheet 2
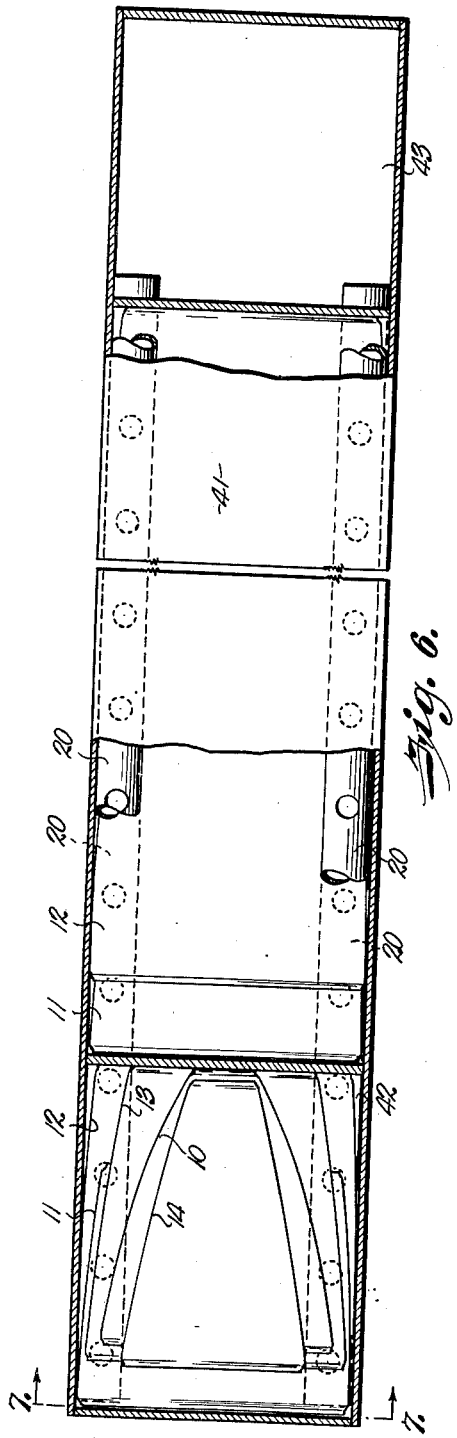
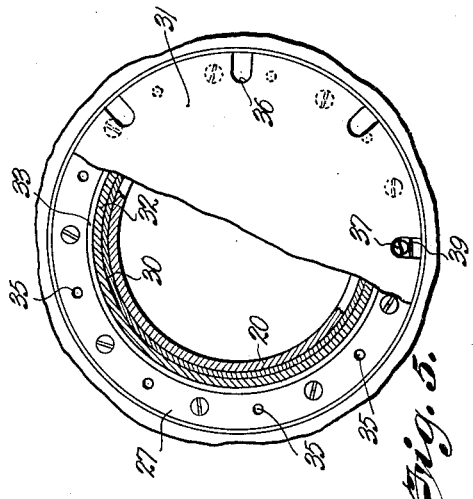
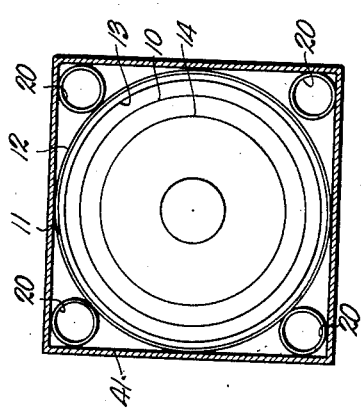
INVENTOR.
George A. Dean
BY
Thos. E. Scofield
ATTORNEY.

Patented Aug. 11, 1953

2,648,454

UNITED STATES PATENT OFFICE 2,648,454

KNOCKDOWN STREAMLINED CONTAINER

George A. Dean, Radburn, N. J.

Application September 17, 1948, Serial No. 49,669

11 Claims. (Cl. 220—5)

The present invention relates in general to containers, and it deals more particularly with auxiliary fuel tanks of the type temporarily attached to aircraft to increase their flying range, which tanks are jettisoned after their contents have been exhausted.

Such auxiliary tanks commonly are streamlined structures adapted for mounting on the exterior of the aircraft, for example on the underside of the wings at the tips thereof or underneath the fuselage. Being expendable in the course of flight, new tanks obviously are required at the start of each new flight; therefore they must be supplied in large numbers to the airfield from which the flights originate, and because the tanks are very bulky, their shipment to the airfield from the manufacturing plant ordinarily presents a major problem.

The object of the present invention, broadly speaking, is to solve this problem. More specifically the main object of the invention is to provide a tank of the character indicated which can be shipped in knocked down or disassembled condition, making a compact package, and which can conveniently be assembled at the airfield or close thereby.

Another object is to provide a knockdown tank made up of annular shell sections tapered so they may be nested one within another when the sections are disassembled.

Still another object is to provide a knockdown tank which, when assembled, is perfectly streamlined and free from surface irregularities offering resistance to air flow.

Another object is to provide a sectionalized tank which may be assembled quickly and easily without the use of special tools.

A further object is to provide a knockdown container which, when assembled, is very strong and whose joints are fluid tight under the severe conditions of acceleration and strain encountered in the flight of aircraft. Another object is to provide a novel arrangement for controlling the tightening of the joints and preventing and loosening thereof when once adjusted.

Still another object is to provide an improved arrangement for supporting a tank whereby the load is transmitted to the support independently of the tank shell or skin.

Other and further objects, together with the features of novelty whereby the objects are achieved, will appear in the course of the following description of the invention.

In the accompanying drawings which form a part of the specification and are to be read in conjunction therewith, and in which like reference numerals are employed to indicate like parts of the various views:

Fig. 1 is a side elevation of a tank embodying the invention, parts having been broken away for purposes of illustration, Fig. 2 is an enlarged transverse cross section taken along the line 2—2 of Fig. 1 in the direction of the arrows, Fig. 3 is an enlarged radial cross section taken along the line 3—3 of Fig. 2, Fig. 3A is a cross sectional view corresponding to Fig. 3 but showing a modified type of joint, Fig. 4 is a radial cross section taken along the line 4—4 of Fig. 1 in the direction of the arrows, Fig. 5 is a sectional elevation taken along the line 5—5 of Fig. 4 in the direction of the arrows, Fig. 6 is an elevational view of a shipping crate for a plurality of tanks, parts having been broken away to illustrate the manner in which the disassembled tanks are packed therein, and Fig. 7 is a transverse cross section taken along the line 7—7 of Fig. 6.

Referring more particularly to Fig. 1 of the drawings, the tank there shown is of streamlined or tear drop shape, the shell being made up of five coaxial sections 10, 11, 12, 13 and 14 fastened end to end. Between adjacent sections are bulkheads 16, 17, 18 and 19 all of which are rigidly secured to a hollow central spar 20. For the purpose of fastening the bulkheads to the spar, a series of collars 21, 22, 23 and 24 are welded to the spar at spaced intervals along its length, each collar having an integral annular flange 25 to which one bulkhead is bolted. Lightening holes 26 are provided in the spar to reduce its weight.

As best seen in Fig. 2, each bulkhead comprises an inner ring $a$ and an outer ring $b$ connected by radial arms $c$. The outer ring contains opposed annular grooves or recesses $d$ (see Fig. 3) adapted to receive the inwardly swaged ends $e$ of adjacent sections of the shell; these ends are seated in sealing gaskets $f$ in the groove, and the swaged portions are reinforced by a circumferential flange or rim $g$ on the bulkhead, encircling them and backing them up. By conforming to the general contour of the envelope, the circumferential outer flange $g$ serves both to complete the streamlining of the tank at the joint and also provides, in alignment with the main outside wall of the two associated shell sections, abutment surfaces adapted to take the end thrust of the sections whereby excessive end pressure is not imposed on the gaskets.

An alternative form of joint is shown in Fig. 3A. This employs retainer rings $h$ welded to the shell sections, the rings and the bulkhead being recessed to receive gaskets $j$ of the O ring type to form a fluid tight joint. The margins of the retainer rings also are recessed so that the rings fit within the axially projecting flanges or rims $k$ on the bulkhead, these serving to prevent lateral shifting of the shell sections while at the same time preserving the smooth surface contour of the tank at the joint.

Each end section has a reinforcing ring 27 secured thereto by bolts 28, a gasket 29 being interposed between the shell and ring to prevent leakage. An externally threaded sleeve 30 is shrunk on opposite ends of the spar 20, and screwed to this sleeve is a rounded nut or end cap 31 which is tightened up against the ring. It will be observed that the bore of ring 27 is larger than the threaded sleeve and that the end cap has a forwardly projecting flange 32 adapted to enter the annular space between the two to hold them in concentric relationship. Around this flange is a resilient sealing ring 33 which seats against the beveled surface of ring 28 to prevent leakage when the cap is tightened down.

The manner in which the tank is assembled now will be described. First, the central shell section 12 is slipped over the spar 20 and advanced until its ends are properly positioned relative collars 22 and 23; then the bulkheads 17 and 18 are slipped over opposite ends of the spar and while the shell section is supported so it is coaxial with the spar, they are bolted to the flange on collars 22 and 23. It will be observed that bulkheads 17 and 18 pass over collars 21 and 24 respectively in reaching their proper positions, the annular flanges on these two collars being smaller in diameter than the flange to which the bulkheads ultimately are bolted, and the central holes in the bulkheads being of such size that they pass easily over the smaller flanges.

The central shell section 12 now is supported by bulkheads 17 and 18, its opposite ends being seated in the annular grooves in the respective bulkheads. Next, shell sections 11 and 13 are slipped over the spar from opposite directions and placed as illustrated, after which bulkheads 16 and 19 are installed and bolted to the flanged collars 21 and 24, respectively, to hold sections 11 and 13 in place. The central holes in the latter bulkheads are, of course, smaller than the central holes in bulkheads 17 and 18. Finally the end sections 10 and 14 are positioned, and the rounded nuts or end caps 31 are screwed to opposite ends of the spar to complete the assembly.

As the end nuts are tightened down, they place all sections of the skin or shell under axial compression, insuring a proper seal at the joints. They should be tightened to such an extent that a sealing load is set up equal to the highest load which might be obtained under extreme accelerations of the airplane. For example, if the tank gross weight is one thousand pounds and the airplane exerts the acceleration on the tank of 8G, then the load on the seals during acceleration is approximately 8 thousand pounds. The nuts in this case would be tightened to an amount greater than this figure, assuring against opening up of the seams during this flight condition.

When the desired compression has been achieved, it is essential that this be maintained, and in order to prevent the end nuts from backing off, a series of circumferentially spaced taped holes 35 are provided in ring 27 (see Fig. 5). A different number of circumferentially spaced recesses or notches 36 are provided in the end nuts or caps; the specific number of holes and notches may be varied, but with nine holes in the ring and eight notches in the cap, as shown, some notch and some hole will be in alignment with one another at each five degrees rotation of the cap. Thus it never is necessary to turn the cap more than five degrees from adjusted position in order to uncover some hole into which a lock screw 37 can be introduced. The head of this screw occupies the notch or recess in the cap and prevents same from subsequent rotation; associated with the lock screw 37 is a lock washer 39 which prevents the screw itself from loosening.

The filler cap for the tank has not been shown since it forms no part of the present invention, but it will be understood that this can be located in any shell section or in either end cap 31. Baffles may be installed in the tank to minimize shifting and surging of the fluid contents and the tank may also be internally reinforced, if desired, by guys or braces of any desired character. When filled, the fluid load in either end of the tank is transmitted by the central spar 20 to bulkheads 17 and 18 which have bolted thereto a bracket 40; the tank depends from this bracket, the apparatus for fixing the bracket to the aircraft having been omitted from the drawings for simplicity, since it forms no part of the instant invention. Thus it will be seen that all mounting loads are transmitted to the center spar through bulkheads 17 and 18, eliminating the possibility of skin failure which exists when the mount fittings are attached directly to the outer skin, as is conventional.

When disassembled, four tanks can conveniently be packed together for shipment to the assembly point in a crate only slightly longer than the crate required to ship one tank in assembled condition. Referring to Figs. 6 and 7, the crate 41 is divided longitudinally into compartments, the first of which (42) holds all of the shell sections for one tank, nested one within another as illustrated. Similarly nested, the shell sections for the other tanks occupy adjoining compartments, and the central spars 20 for the four tanks run through these compartments in the four corners of the crate. The bulkheads and other fittings are packed in a compartment 43 at the end of the crate.

Thus it will be seen that the aims of the invention have been achieved, the tank shown and described being well adapted to attain all the ends and objects hereinbefore set forth, as well as having other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described the invention, I claim:

1. A knockdown container comprising at least three annular open ended shell sections disposed end to end, a ring between each pair of shell sections containing opposed annular recesses for receiving the adjoining ends of said pair of shell sections, the ends of the sections disposed in said grooves being inwardly swaged, the exterior of the ring conforming with and forming a continuation of the contour of the main portion of the shell sections beyond their swaged ends, a spar extending axially through the container from one end thereof to the other, and means on the spar engaging the end shell sections and drawing same axially toward one another thereby to clamp all of said shell sections together.

2. A knockdown tank comprising a plurality of annular open ended shell sections disposed end to end, a ring between each pair of shell sections containing opposed annular recesses for receiving the adjoining ends of said pair of shell sections, a spar extending axially through the tank from one end thereof to the other, means at the extremities of the spar engaging the outermost ends of the two end shell sections, one of said means comprising a nut threaded to the spar and rotatable to clamp said shell sections together, said nut having flange means adapted to enter the annular space between the spar and the outermost extremity of the end shell section thereby to prevent lateral shifting of said extremity relative the spar, and a device to lock said nut in tightened position.

3. A knockdown tank comprising a plurality of annular open ended shell sections disposed end to end, a ring between each pair of shell sections containing opposed annular recesses for receiving the adjoining ends of said pair of shell sections, a spar extending axially through the tank from one end thereof to the other, means at the extremity of the spar engaging the outermost ends of the two end shell sections, one of said means comprising a nut threaded to the spar and rotatable to clamp said shell sections together, and a device to lock said nut in tightened position, said device comprising a screw threaded connection between said nut and the end shell section, said connection spaced radially from the axis of the nut.

4. A knockdown tank comprising at least three annular shell sections disposed end to end, a spar extending axially through said sections and having a bulkhead for the joint between each pair of sections, each bulkhead having an annular rim whose outside diameter conforms with the outside diameter of the shell sections at the joint, the adjoining ends of each pair of shell sections being inwardly offset to fit within the rim, means on opposite extremities of the spar engaging the end shell sections for drawing same axially toward one another thereby to clamp all the shell sections together, and a support outside of the tank connected to a plurality of bulkheads to carry the weight of the tank.

5. A tank as in claim 4 having means for sealing the adjoining ends of each pair of shell sections to the associated bulkhead.

6. A tank as in claim 4 wherein each shell section is tapered from one end to the other so the sections can be nested one within another when the tank is knocked down.

7. In a knockdown tank, a spar having a pair of integral radially projecting flanges, said flanges being spaced axially of the spar from one another, a centrally apertured bulkhead, the central aperture being of a size and shape to pass along the spar and over one of said flanges to bring the face of the bulkhead into engagement with the other flange, means removably securing the bulkhead to said other flange, a second centrally apertured bulkhead encircling the spar and removably secured to said one flange, and an open ended annular shell section coaxial with said spar spanning the space between said bulkheads, said bulkheads having annular recesses for receiving opposite ends of said shell section.

8. In a tank as in claim 7 annular means engaging one of said bulkheads opposite said recess therein, and an adjustable connection between said means and said spar for advancing said means along the spar toward said shell thereby to apply pressure on the bulkhead for clamping the shell.

9. In a knockdown tank, an elongate spar having intermediate its ends a fixedly positioned disk-like flange, a centrally apertured bulkhead encircling the spar and abutting the face of said flange, means detachably securing said bulkhead to the flange, said spar having a second fixed disk-like flange which is smaller in diameter than the central aperture in said bulkhead, said second flange spaced longitudinally of the spar from said first flange in such a direction that said bulkhead is between the two flanges, a second centrally apertured bulkhead encircling the spar and abutting the face of said second flange which lies farthest from said first flange, means detachably securing said second bulkhead to said second flange, an open-ended annular shell encircling said spar and spanning the space between the two bulkheads, said bulkheads having confronting annular grooves for receiving opposite ends of said shell to hold the latter in co-axial relation to said spar.

10. A knockdown tank comprising a plurality of annular shell sections disposed end to end, a spar extending axially through the tank from one end of the tank to the other, means at the extremities of said spar engaging the outermost ends of the two shell sections, one of said means comprising a nut threaded to the spar and rotatable to clamp said shell sections together, said nut having a series of circumferentially spaced apertures arranged in a circle concentric with the axis of the nut, the end shell section likewise having a series of circumferentially spaced apertures arranged in a circle registering with said first circle, the number of apertures in said first series differing from the number of apertures in said second series whereby the individual apertures of said first series are brought into register successively with individual apertures of said second series in a predetermined sequence as said nut is rotated relative to said end shell section, and a member insertable into any pair of apertures when same are in register to lock said nut against rotation.

11. A knockdown tank comprising a plurality of annular shell sections disposed end to end, a spar extending axially through the tank from one end of the tank to the other, means at the extremities of said spar engaging the outermost ends of the two shell sections, one of said means comprising a nut threaded to the spar and rotatable to clamp said shell sections together, said nut having a series of circumferentially spaced apertures arranged in a circle concentric with the axis of the nut, the end shell section likewise having a series of circumferentially spaced apertures arranged in a circle registering with said first circle, the number of apertures in said first series differing from the number of apertures in said second series whereby the individual apertures of said first series are brought into register successively with individual apertures of said second series in a predetermined sequence as said nut is rotated relative to said end shell section, each aperture of one of said series being threaded to receive a screw, and a screw adapted to be advanced into any one of said threaded apertures through any registering aperture of the other series, said screw having a portion projecting into said last aperture to prevent further rotation of said nut.

GEORGE A. DEAN.

References Cited in the file of this patent

UNITED STATES PATENTS

| Number | Name | Date |
|---|---|---|
| 643,787 | Brochou | Feb. 20, 1900 |
| 1,316,949 | Hall | Sept. 23, 1919 |
| 1,535,308 | Hele-Shaw et al. | Apr. 28, 1925 |
| 1,691,753 | Blincow | Nov. 13, 1928 |
| 1,802,716 | Howcott | Apr. 28, 1931 |
| 1,842,260 | Freitag et al. | Jan. 19, 1932 |
| 1,844,530 | Twaits | Feb. 9, 1932 |
| 2,300,259 | Kueppers | Oct. 27, 1942 |
| 2,326,414 | Thompson | Aug. 10, 1943 |
| 2,381,456 | Langdon | Aug. 7, 1945 |
| 2,383,065 | Lehman | Aug. 21, 1945 |
| 2,471,296 | Allen et al. | May 24, 1949 |

FOREIGN PATENTS

| Number | Country | Date |
|---|---|---|
| 5,103 | Great Britain | Mar. 11, 1905 |